A. M. MACE.
Vapor Burner.
No. 1,034. Reissued Sept. 4, 1860.
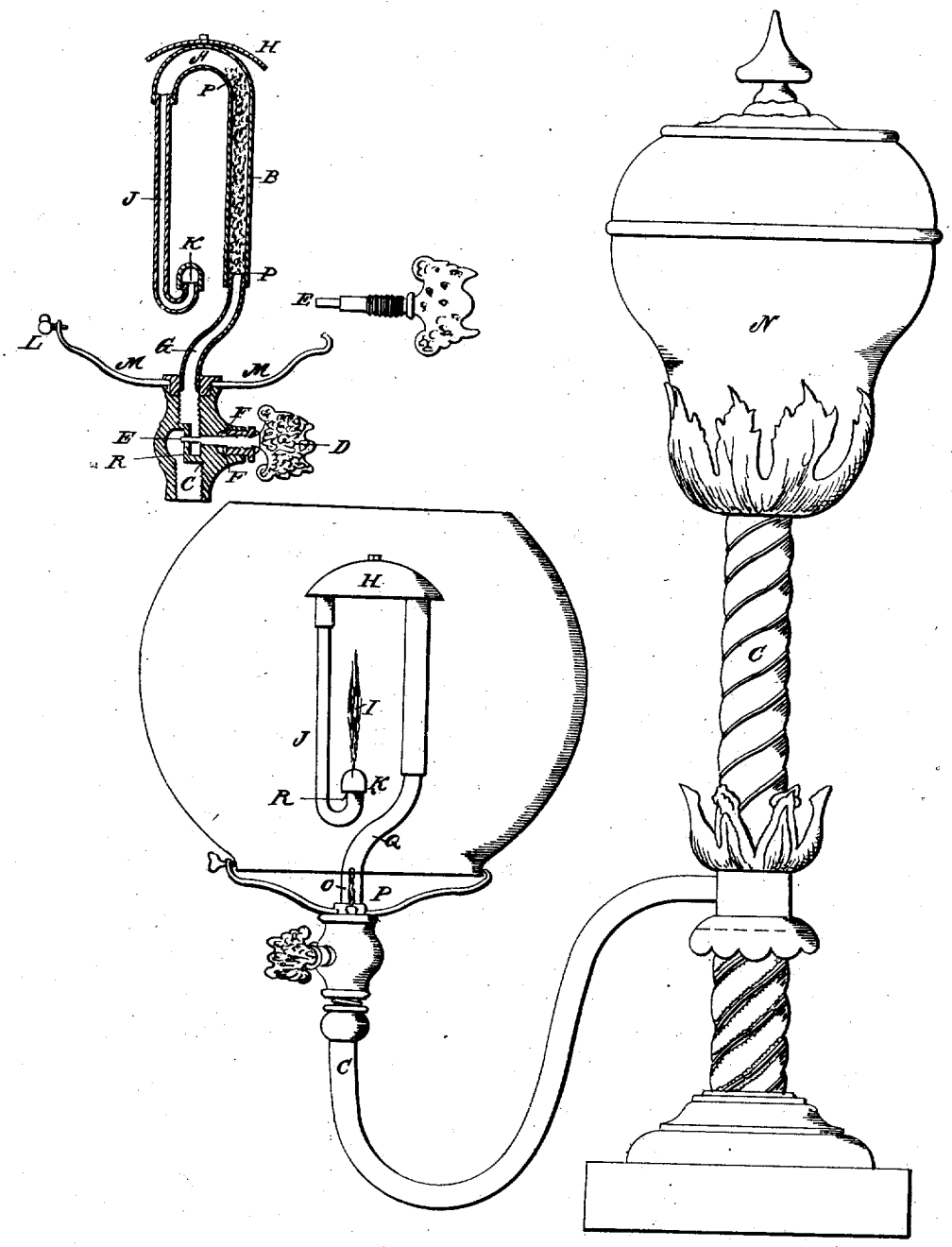
N. PETERS. Photo-Lithographer. Washington, D. C.

UNITED STATES PATENT OFFICE.

ALONZO M. MACE, OF SPRINGFIELD, MASSACHUSETTS.

IMPROVEMENT IN VAPOR-LAMPS.

Specification forming part of Letters Patent No. 20,649, dated June 22, 1858; Reissue No. 1,034, dated September 4, 1860.

*To all whom it may concern:*

Be it known that I, ALONZO M. MACE, of the city of Springfield, in the county of Hampden and State of Massachusetts, have invented certain new and useful Improvements in Hydrocarbon-Vapor Burners; and I do hereby declare that the following is a full, clear, and exact description of the construction and operation of the same, reference being had to the accompanying drawings, and to the letters of reference marked thereon, making a part of this specification.

The nature of my invention consists in providing heating and vaporizing tubes or retorts to be used in vaporizing hydrocarbon liquids by the heat of burners supplied with vapor generated within said tubes or retorts, with a heat-retaining cover or cap so connected to the retort as to retain or reflect the heat upon or around the surface opposite the flame.

It also consists in such an arrangement of the parts hereinafter mentioned as to produce the perfect vaporization of the hydrocarbon fluid and a high degree of illumination, as hereinafter stated, the pipe conducting the fluid between the valve and burner being made continuous, and so bent as to pass upward from a point below the burner, thence over or above the flame receiving the heat at its intermediate part, thus forming a siphon-shaped conduit, whereby a glass globe and its sustaining-fixture may readily be attached.

To construct my invention and to put the same in practice, make a reservoir, N, of tin or other suitable material, to contain any desirable quantity of carbonaceous liquid, and place it in the upper part of a building to be lighted, or at any convenient elevation above the burner, so that the liquid is forced through the apparatus by hydrostatic pressure. Coal-gas fixtures in common use may be used to convey the liquid to the generator and burner. The valve C′ may be connected in the usual place of the common gas-burner, and is made like the common globe-valve, except that its spindle D and seat E in the diaphragm are made nearly straight to nicely regulate the flow of the liquid to the generator. To the valve C′ connect the conducting-pipe G, and to this attach the vaporizing tube or retort B A, so bent at its upper part as to bring it over or above the flame of the burner K, or in any manner so that the illuminating flame will heat it sufficiently to gasify the liquid as it is supplied to the bent portion. The retort or tube may be charged or packed with fibrous or light material, as shown at P P, to equalize the flow of the liquid through the retort. To the upper part of the retort, at A, connect a cover or cap, H, which may be made of iron, brass, or other material, to retain and impart its heat slowly to the tube or retort. This cap may be concave upon its under surface, so as to have a greater radiating-surface, or it may be made of any desired form to answer best the purposes above stated. The vapor generated within the retort or tube B A is conducted by a pipe, J, to the burner K. The fluid is conducted by a pipe, C and G, to the vaporizing-tube, and is charged into the tube and through the packing by hydrostatic pressure from the fountain N. The vaporizing tube or retort may be made of sheet brass or iron formed into a tube and bent at its upper part, so that a portion of its surface over the flame is exposed to a high degree of heat.

I do not claim now the use of the heat-retaining cap connected with a retort of a particular construction, as such a patent was granted to me on April 22, 1856; but generally it may be applied to any form of chamber or retort producing the same results. Neither do I claim expanding the vaporizing-tube into a chamber.

What I do claim as my invention, and desire to secure by Letters Patent, is—

1. Combining the cap or heat-retainer H with vaporizing tubes or retorts constructed substantially as described, when so arranged over the flame as to operate in the manner set forth.

2. The combination of the heat-retainer H and vaporizing tube connected, substantially as described, with the elevated reservoir, the whole arranged and operating with respect to the valve C′ and burner K as set forth.

3. The siphonic vapor or gas-generating tube or retort B A, or its equivalent, whereby the material from which the gas is generated is carried over the flame of the gas or vapor burner and subjected to the heat of the flame issuing therefrom and converted into gas or vapor, substantially as set forth.

ALONZO M. MACE.

Witnesses:
MICH. HUGHES,
M. M. LIVINGSTON.